(12) United States Patent
Merlo et al.

(10) Patent No.: US 6,390,764 B1
(45) Date of Patent: May 21, 2002

(54) VEHICLE OPERABLE AS BOTH A LIFTING MACHINE AND AN AGRICULTURAL TRACTOR

(75) Inventors: Amilcare Merlo; Renato Galfre'; Adriano Brondetta, all of Frazione San Defendente di Cervasca (IT)

(73) Assignee: Merlo SpA Industria Metalmeccanica (IT)

( * ) Notice: Subject to any disclaimer, the term of this patent is extended or adjusted under 35 U.S.C. 154(b) by 0 days.

(21) Appl. No.: 09/393,199

(22) Filed: Sep. 10, 1999

(30) Foreign Application Priority Data

Sep. 9, 1998 (IT) .......................... T098A0765

(51) Int. Cl.$^7$ ............................... B66C 23/00
(52) U.S. Cl. ...................... 414/680; 414/718
(58) Field of Search ............... 414/680, 685, 414/703, 718, 920; 180/329, 33.3, 53.6, 326

(56) References Cited

U.S. PATENT DOCUMENTS

| | | | | |
|---|---|---|---|---|
| 2,233,237 A | * | 2/1941 | Andersen et al. | 414/685 X |
| 2,526,396 A | * | 10/1950 | Newlin | 180/53.3 X |
| 2,607,432 A | * | 8/1952 | Lommel | 180/329 X |
| 3,288,316 A | * | 11/1966 | West | 414/685 X |
| 4,315,534 A | * | 2/1982 | Blackstone | 180/53.3 X |
| 4,498,349 A | * | 2/1985 | Nishihara | 180/53.6 X |
| 5,086,869 A | * | 2/1992 | Newberry et al. | 180/329 |
| 5,199,861 A | * | 4/1993 | Merlo et al. | 414/718 |
| 5,664,909 A | * | 9/1997 | Lindgren | 180/329 X |
| 5,921,340 A | * | 7/1999 | Abels | 180/326 |
| 6,071,066 A | * | 6/2000 | Braud | 414/680 X |

FOREIGN PATENT DOCUMENTS

| | | |
|---|---|---|
| EP | 0 577 388 A | 1/1994 |
| EP | 0 680 923 A | 11/1995 |
| EP | 0 823 367 A | 2/1998 |

\* cited by examiner

Primary Examiner—Donald W. Underwod
(74) Attorney, Agent, or Firm—Cantor Coburn LLP

(57) ABSTRACT

A vehicle designed to be operated either as a lifting machine or as an agricultural tractor, comprising a bearing structure with motor-driven wheels, a control and driving cab, a telescopically extendable and retractable lifting boom arranged on one side of the control and driving cab and swingable relative to the bearing structure around a transverse axis located at the front end of the lifting boom, whose rear end carries a three-point hitch for agricultural implements to be operated by a rear power take-off. The lifting boom itself provides a power-lift for agricultural implements.

32 Claims, 4 Drawing Sheets

VEHICLE OPERABLE AS BOTH A LIFTING MACHINE AND AN AGRICULTURAL TRACTOR

BACKGROUND OF THE INVENTION

The present invention is related to a vehicle designed to be employed both as a lifting machine and as an agricultural tractor.

From European Patent EP-B-375705 in the name of the same Applicant a lifting truck is known comprising a bearing structure having a central longitudinal axis, a front section and a rear section and provided with two respectively front and rear axles each having a pair of wheels; an engine unit; a control and driving cab; a telescopically extendable and retractable lifting boom arranged in proximity of the control and driving cab and having one end pivotally connected to the bearing structure around a transverse axis; and actuator means to operate swinging of the lifting boom around said transverse axis between a lowered position, in which the lifting boom is arranged substantially parallel to the longitudinal axis of the bearing structure, and a raised position.

Such vehicles equipped with a telescopic lifting boom arranged longitudinally exhibit a wide employ versatility. While its basic configuration is maintained unchanged, the vehicle can be either operated as a working machine equipped with an aerial platform adapted to be employed in the building industry and the like, or as a fork lift truck, or as a lifting machine in the most differentiated fields, etc. In the above known vehicle, whose commercial success has been and is still today remarkable, the control and driving cab is entirely located on one side of the bearing structure with respect to the longitudinal axis thereof, the engine unit is located on the opposite side of the bearing structure with respect to said longitudinal axis, and the lifting boom is arranged centrally between the control and driving cab and the engine unit, with the rear end thereof pivotally connected to the bearing structure around said transverse axis and the front end thereof designed for connection of a fork, a bucket, an aerial platform, a lifting hook, etc. thereto. The intended use of this known vehicle is thus substantially exclusively that of a lifting machine.

To the aim of further widening the fields of employ of a vehicle with a lifting boom of this type, the Applicant proposed in European Patent Application n. 98830341.8 (unpublished at the priority date of the present application) to provide the lifting vehicle with three-point hitch means and power-lift means for agricultural implements operable by means of a rear power take-off, whereby the lifting truck can thus be employed also as an agricultural tractor.

The general configuration of the vehicle remains in this case substantially unchanged with respect to the arrangement known from European Patent EP-B-375705 mentioned in the above, with its lifting boom pivotally connected at its rear end and arranged centrally between the control and driving cab and the engine unit. The three-point hitch means and the power-lift means for the agricultural implements are in fact borne by a substantially horizontal platform fixed at the rear of the vehicle bearing structure, beneath the transverse pivot axis of the lifting boom.

This so modified vehicle is thus capable of performing all functions of a conventional agricultural tractor, while affording additionally all the advantages deriving from the provision of a high-performance lifting boom. The market to which this known vehicle is mainly addressed is thus the agricultural one: however the general configuration of the vehicle, which is peculiar and relatively unique as compared with that of a conventional agricultural tractors, makes it apparently not much appreciated by the average farmer, traditionally used to operate with tractors having a familiar conventional architecture.

From this point of view a conceptually reversed approach, i.e. starting from an agricultural tractor having a substantially traditional configuration then partially transformed by the addition of a lifting boom, so as to make the agricultural tractor operable even as a lifting vehicle, would appear more efficient under the commercial standpoint. Such an arrangement is shown in European Patent Application EP-A-823367, which discloses an agricultural tractor comprising a bearing structure having a central longitudinal axis, a front section and a rear section and provided with two respectively front and rear axles each having a pair of wheels; an engine unit; a control and driving cab; a power take-off; three-point hitch means and power-lift means from agricultural implements arranged in the rear section of the bearing structure in a substantially centered position relative to said longitudinal axis; a telescopically extendable and retractable lifting boom located in proximity of the control and driving cab and having one end pivotally connected to the bearing structure around a transverse axis; and actuator means to operate swinging of the lifting boom around said transverse axis between a lowered position, in which said lifting boom is arranged substantially parallel to the longitudinal axis of the bearing structure, and a raised position, whereby said agricultural tractor is operable also as a lifting machine.

More particularly, in this known arrangement the control and driving cab is located in the rear section of the bearing structure of the tractor and is centered on the longitudinal axis thereof, immediately above the engine unit. The lifting boom is located in front of the control and driving cab, is also centered on the longitudinal axis of the bearing structure, and has its rear end pivotally connected to a transverse pin arranged in correspondence or in the area of the front wall of the structure defining the control and driving cab.

This known configuration, while been relatively more analogous to that of a conventional agricultural tractor, is affected by several drawbacks.

Firstly the arrangement of the lifting boom in front of the control and driving cab constitutes a serious obstacle to the operator's visibility when the tractor is operated as a lifting vehicle, i.e. while the lifting boom is set in an even only partially raised position.

Secondly the location of the transverse pivot axis of the lifting boom in front of the control and driving cab involves a critical limitation to the working length of the lifting boom itself. On the other hand, in order to not excessively penalize this working length, in its lowered and retracted positions this lifting boom is necessarily protruding beyond the wheels of the tractor front axle, with evident encumbrance problems. For this reason in practice the lifting boom has to be removed when the vehicle is operated as an agricultural tractor, and is then again installed when the vehicle is instead employed as a lifting truck. Evidently installation and removal of the lifting boom require relatively long and difficult operations, also involving the provision of some auxiliary equipment.

A further inconvenience of this known vehicle resides in the uneven weight distribution on the axles thereof: the control and driving cab and the engine unit are in fact both loading the rear axle, with the further addition of the weight of the agricultural implement connected to the rear three-point hitch and related power-lift. It is believed that this load unbalance, i.e. the reduced load applied onto the front axle, may result into serious manoeuvrability difficulty of the vehicle: for this reason not only the front axle wheels but even the rear axle wheels are made steerable. The four-wheel steering system evidently involves constructive complications and consequent additional costs.

Lastly the agricultural tractor functions and the lifting machine functions, and the related devices specifically designed therefor, are completely autonomous and independent from one another. In particularly the power-lift operatively associated to the three-point hitch solely performs the task of lifting the agricultural implement when necessary, while the lifting boom carries out in turn exclusively the task of lifting the piece of equipment (fork, bucket, aerial platform, etc) applied to the front end thereof. In practice this known vehicle requires duplication of an apparatus designed for a same general function, namely that of implement lifting.

SUMMARY OF THE INVENTION

The general object of the present invention is to overcome the above drawbacks.

A particular object of the invention is to provide a vehicle operable both as a lifting machine and as an agricultural tractor whose general configuration is not much different than that a conventional agricultural tractor.

A further object of the invention is to provide vehicle operable both as a lifting machine and as an agricultural tractor which is designed to ensure, in both operating functions, the best visibility for the operator.

A further object of the invention is to provide a vehicle operable both as a lifting machine and as an agricultural tractor whose lifting boom has a greater working length and, in the lowered position thereof, does not involve any encumbrance or projection beyond the front section of the vehicle bearing structure.

A further object of the invention is to provide a vehicle operable both as a lifting machine and as an agricultural tractor having a quite balanced load distribution on both front and rear axles, so as to ensure the best manoeuvrability without any need of resorting to rear steering wheels.

Still another object of the invention is to provide a vehicle operable both as a lifting machine and as an agricultural tractor wherein the lifting function both for an agricultural implement secured to the three-point hitch and of a non-agricultural tool or device carried by the lifting boom is carried out by one single item.

According to the present invention, these objects are achieved by means of a lifting machine the main feature of which resides in that:

the lifting boom is located on one side of the control and driving cab, the pivot transverse axis of the lifting boom is located in the front section of the bearing structure, whereby the end of said lifting boom pivotally connected to the bearing structure is the front end thereof, the three-point hitch means are carried by the rear end of the lifting boom, and said power-lift means for agricultural implements are constituted by the lifting boom itself.

Viewed from a different standpoint, the present invention is directed to an agricultural tractor the main feature of which resides in that:

the transverse pivot axis of the lifting boom is located in the front section of the bearing structure, whereby the end of said lifting boom which is pivotally connected to the bearing structure is the front end thereof, said three-point hitch means are carried by the rear end of the lifting boom, and said power-lift means for agricultural implements are constituted by the lifting boom itself.

BRIEF DESCRIPTION OF THE DRAWINGS

The invention will now be disclosed in detail with reference to the accompanying drawings, purely provided by way of non limiting example, in which.

DETAILED DESCRIPTION OF THE INVENTION

Figure 1:
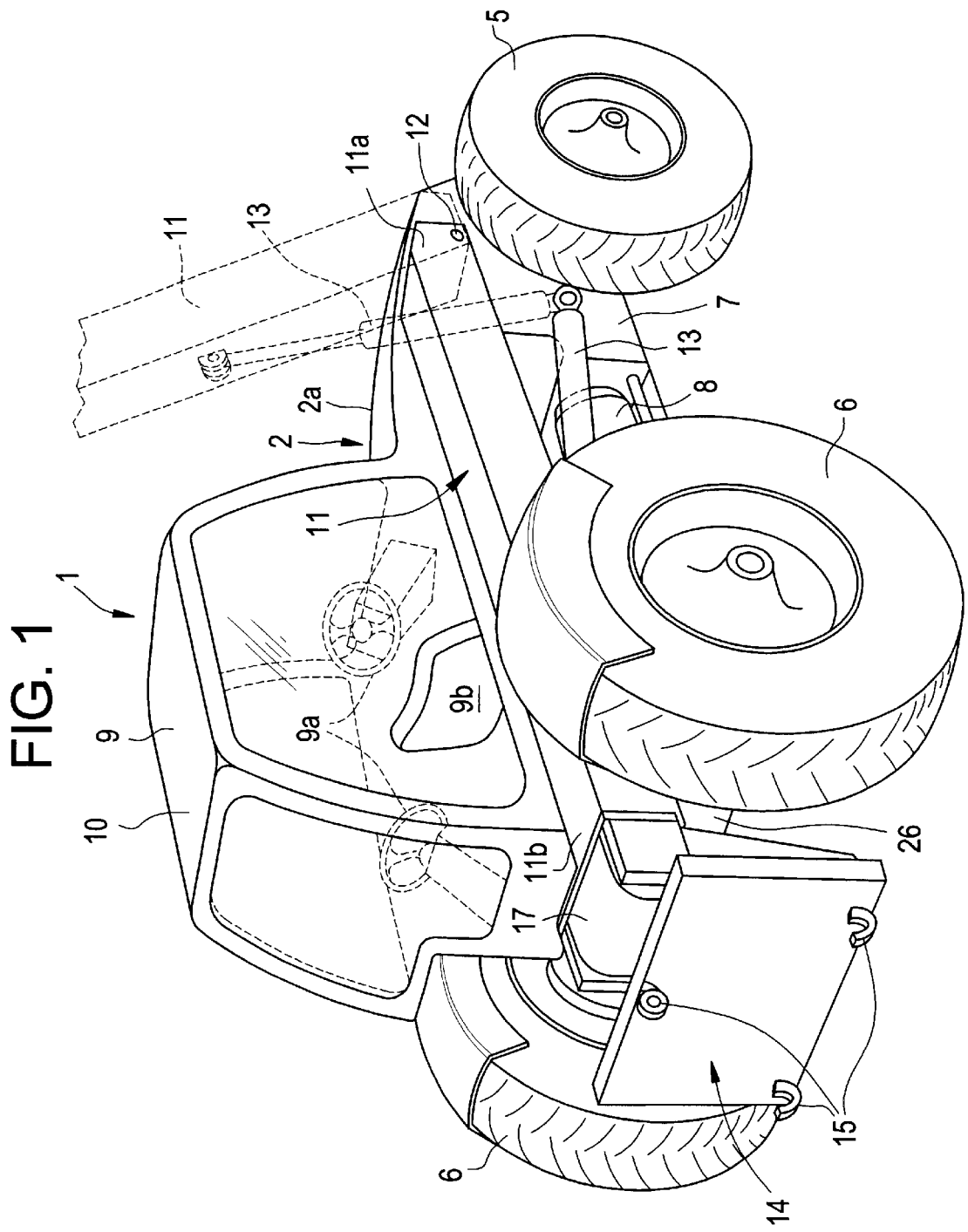
FIG. 1 a diagrammatic and simplified perspective view of a vehicle according to the invention operable both as a lifting machine and as an agricultural tractor.

In the drawings, reference numeral 1 generally designates a vehicle according to the invention which is operable both as a lifting machine and as an agricultural tractor.

The general configuration of the vehicle 1 is not unlike that of a convention agricultural tractor, with a bearing structure or frame 2 supported, through traditional suspension means not shown in the drawings, by a front axle 3 and a rear axle 4. The front axle 3 includes a pair of front steering wheels 5 having a smaller diameter, which can optionally be motor driven, and the rear axle 4 includes a pair of rear wheels 6 having a greater diameter, which are motor driven and normally non-steerable.

Figure 4:
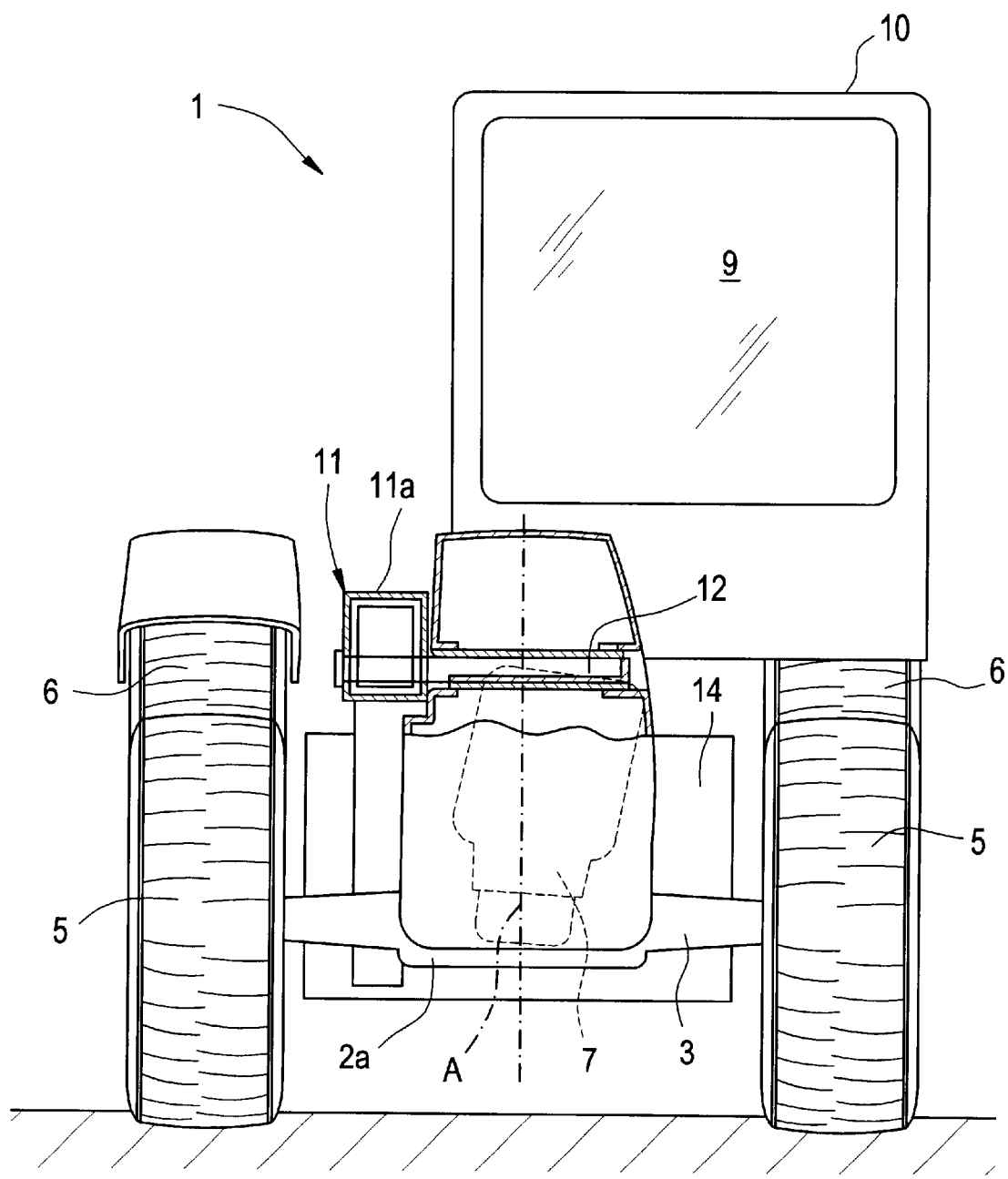
FIG. 4 is a partially vertically sectioned view along line IV—IV of FIG. 2.

Reference numeral 7 designated a combustion engine located immediately rearwardly of the front axle 3 and arranged at an upper level than this front axle 3. As better depicted in FIGS. 2 and 4 the combustion engine 7 is located partially between the front wheels 5 and is substantially aligned with the longitudinal axis of the vehicle 1, designated as A, even if with a slight inclination to the aim of preventing any possible interference with the front wheels 5 in the completely steered condition thereof.

The combustion engine 7 operates, through an hydrostatic or mechanical or hydrodynamic transmission assembly 8, the front axle 3 and the rear axle 4, as well as a rear power take-off 18 centered on the longitudinal axis A.

The bearing structure 2 generally defines a front section 2a, corresponding to the front axle 3 and in correspondence of which the engine unit 7 and the transmission assembly 8 are located, and a rear section 2b, corresponding to the rear axle 4 and in correspondence of which the power take-off 18 is located.

A control and driving cab generally designated as 9 is provided for operating the vehicle 1, which is located rearwardly of and at an upper level with respect to the engine 7, and is defined by a cabin structure 10 extending between the rear section 2b and the front section 2a and the major part of which is offset towards one side (the left side with reference to the drawings) of the bearing structure 2 relative to the longitudinal axis A.

Figure 2:
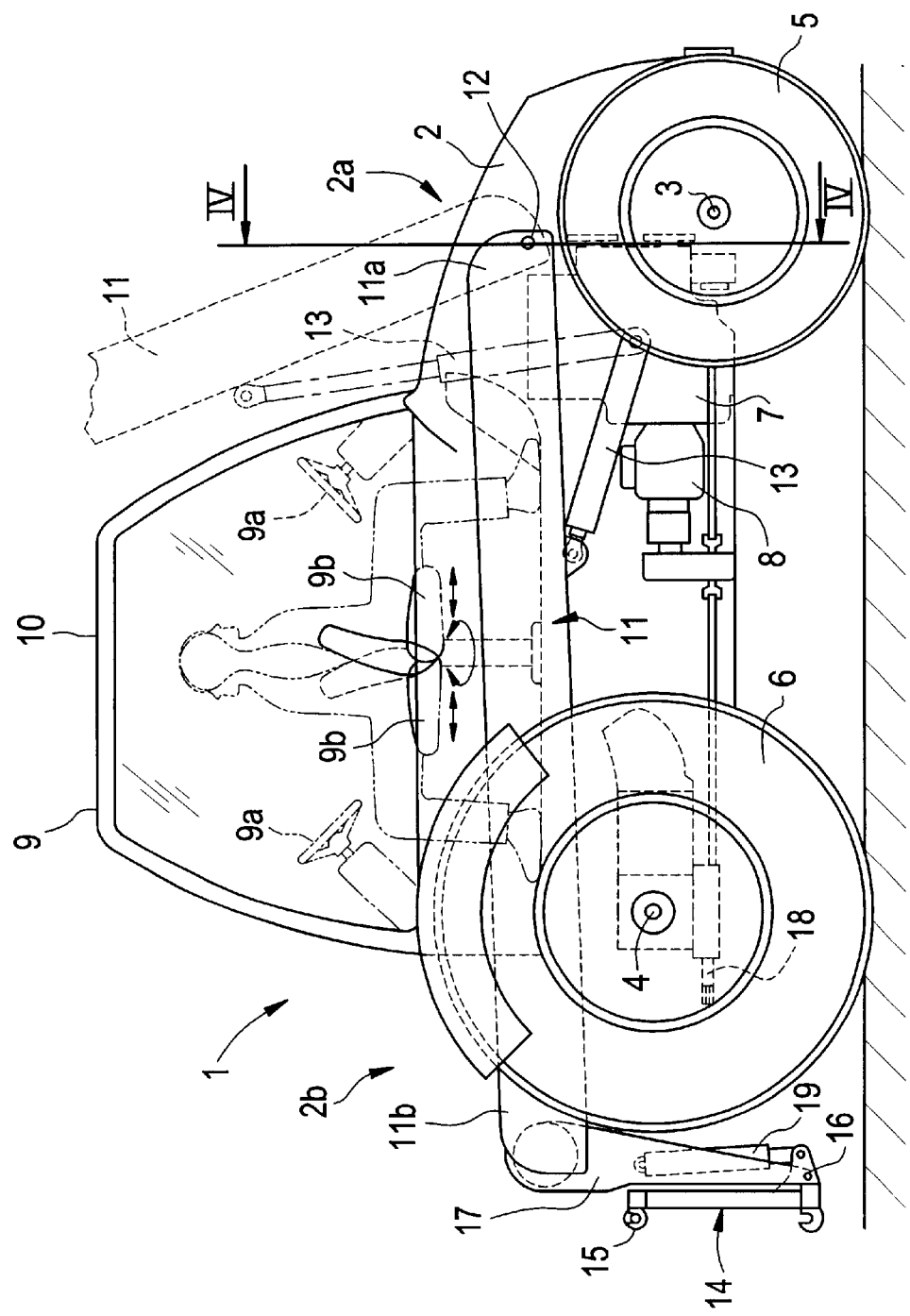
FIG. 2 is a lateral elevational view of figure
Figure 3:
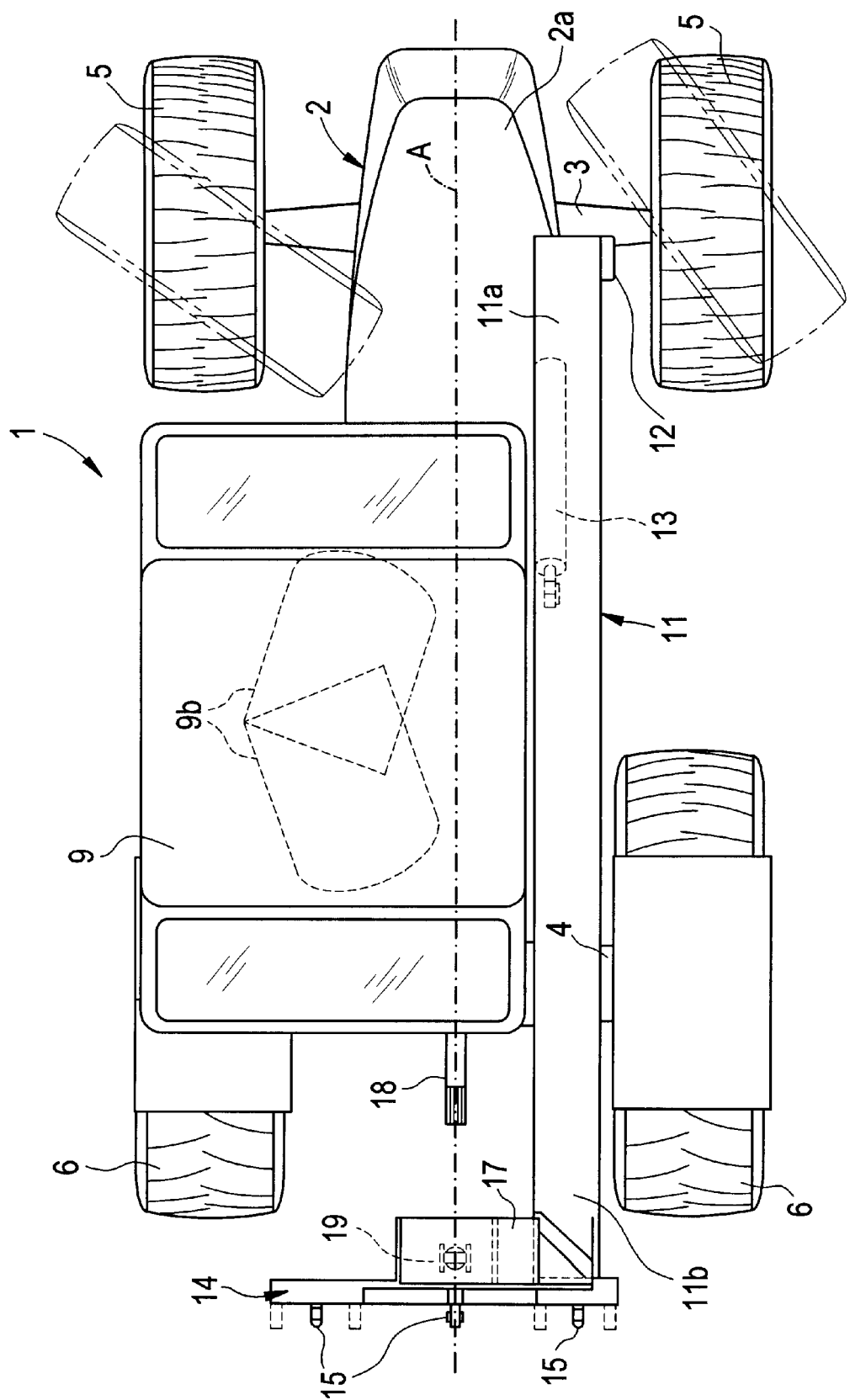
FIG. 3 is a top plan view of FIG. 2.

The control and driving cab 9 includes a controls and a seat which are reversible, i.e. they can be rotated between a forwardly-facing condition and a rearwardly-facing condition, such as depicted in FIG. 2. As diagrammatically shown in FIG. 3, in each of the forward and rearward conditions seat is oriented with an angle towards the longitudinal axle A.

A longitudinal lifting boom 11 is provided on one side of the cab 9, having a telescopically extendable and retractable construction of a generally known type, and thus not shown in detail. As it can be better seen in FIGS. 3 and 4 the lifting boom 11 is not centered along the longitudinal axis A, but is instead offset towards the other side (the right side with reference to the drawings) of the bearing structure 2 relative to the longitudinal axis A. The front end of the lifting boom 11, designated as 11a, is pivotally connected to the front section 2a of the bearing structure 2 around a transverse axis 12, whereby the boom 11 is swingable between a lowered position depicted with full lines in the drawings, and a raised position shown in FIG. 1 and FIGS. 1 and 2 with dotted lines. In its lowered position the lifting boom 11 does not protrude beyond the front section 2a of the bearing structure 2 and is located at a substantially lower level than the cabin structure 10, i.e. of the control and driving cab 9. Actually the position in the longitudinal direction of the transverse pivot axis 12 of the lifting boom is quite close to the front axle 3, at an upper level relative thereto.

A lower hydraulic jack 13 is provided, in a fashion generally known per se to operate swinging of the lifting boom 11 around the transverse axis 12 between the lowered and raised positions.

The rear end of the lifting boom 11, designated as 11b, projects from the rear section 2b of the bearing structure 2 and carries a mounting plate 14 supporting a three-point hitch for agricultural implements of a conventional type, generally designated as 15. The mounting plate 14 is swingably supported around a lower pin 16 by a bracket support 17 which in turn is secured to the rear end 11b of the lifting boom 11. The arrangement of the support bracket 17 is such that the mounting plate 14 together with the three-point hitch 15 is centered with respect to the longitudinal axis A, and thus relative to the rear power take-off 18. Furthermore, owing to the pivotal connection 16, the mounting plate 4 can be rotated relative to the bracket support 17, for instance by means of a linear hydraulic actuator 19.

The three-point hitch 15 of the mounting plate 14 is designed for connecting therewith any conventional agricultural implement as well as, either directly or following interposition of a suitable adaptor, of non-agricultural tools, such as for instance a lifting fork, a bucket, an aerial platform, etc. Therefore, the lifting boom acts not only as a lifting device for a non-agricultural tool, but also as a power-lift for an agricultural implement, thus replacing a conventional power-lift normally associated to the three-point hitch of a traditional agricultural tractor.

Naturally, the agricultural implement carried by the mounting plate 14 shall be operated, in a conventional way, by the rear power take-off 18, through a transmission not illustrated in the drawings. Picking-up and realising the agricultural implement relative to the three-point hitch 15 shall be made more convenient by virtue of the possibility to adjust positioning of the mounting plate 14 relative to the rear section 2b of the bearing structure 2 of the vehicle 1, not only as far as fitting to the power take-off is concerned, but even along the longitudinal direction upon extension/retraction of the lifting boom 11, while inclination thereof can also be regulated by means of the actuator 19.

In summary the vehicle according to the invention such as previously disclosed and defined in the following claims, thus comprises a bearing structure with motor-driven wheels, a control and driving cab, a telescopically extendable and retractable lifting boom provided in proximity, and more particularly on one side, of the control and driving cab and swingable relative to the bearing structure around a transverse axis, and a power take-off, wherein said transverse axis is located at the front end of the lifting boom, the rear end of this lifting boom carries three-point hitch means for agricultural implements adapted to be operated by the power take-off, and the lifting boom itself defines a power-lift for agricultural implements, as well as for non agricultural tools.

The advantages deriving from this arrangement can be briefly summarized as follows:

great similarity of the vehicle to a conventional agricultural tractor, which it is believed may result into a greater appreciation by farmer users;

maximum visibility for the operator in either employ mode of the vehicle, i.e. both as a lifting machine and as an agricultural tractor;

optimum load distribution on the front and rear axles and thus optimum manoeuvrability even in case only the front wheels are made steerable;

no constraint as far as the working length of the lifting boom is concerned;

no encumbrance or outward projection of the lifting boom in front of the vehicle;

suppression of a conventional power-lift as traditionally associated to the three-point hitch for agricultural implements;

possibility to displace the three-point hitch, and thus the agricultural implement carried thereby, in a longitudinal direction to move it near or away with respect to the vehicle rear section.

Naturally, the details of construction and the embodiments may be widely varied with respect to what has been disclosed and illustrated, without thereby departing from the scope of the present invention such as defined in the appended claims.

What is claimed is:

1. A lifting vehicle comprising:
   a bearing structure having a central longitudinal axis, a front section and a rear section and further provided with two respectively front and rear axles each having a pair of wheels,
   an engine unit,
   a control and driving cab,
   a telescopically extendable and retractable lifting boom arranged in proximity of said control and driving cab and having front and rear ends, one of said front and rear ends being pivotally connected to said bearing structure around a transverse axis,
   actuator means to operate movement of said lifting boom around said transverse axis between a lowered position, in which said lifting boom is arranged substantially parallel to said longitudinal axis of said bearing structure, and a raised position,
   a power take-off,
   a three-point hitch means and, a power-lift means for agricultural implements located adjacent said rear section when the lifting boom is in the lowered position,
   whereby said lifting vehicle is also operable as an agricultural tractor,
   wherein:
   said lifting boom is located on one side of said control and driving cab, said transverse pivot axis of said lifting boom is located in said front section of said bearing structure, whereby said lifting boom is said pivotally connected at said front end thereof, said three-point hitch means is carried by said rear end of said lifting boom, and said power-lift means for agricultural implements is provided by said lifting boom itself.

2. Lifting vehicle according to claim 1, wherein:

said control and driving cab is offset towards one side of said bearing structure relative to said longitudinal axis, said lifting boom is offset towards the other side of said bearing structure relative to said longitudinal axis, said rear end of said lifting boom is provided with a mounting structure to center said three-point hitch means with respect to said longitudinal axis.

3. Lifting vehicle according to claim 2, wherein said mounting structure is pivotally connected to said rear end of said lifting boom.

4. Lifting vehicle according to claim 1, wherein said control and driving cab includes controls and a seat which can be selectively positioned either in a forwardly or in a rearwardly-facing condition.

5. Lifting vehicle according to claim 1, wherein said control and driving cab is substantially arranged at an upper level relative to said engine unit and is located rearwardly of the latter.

6. Lifting vehicle according to claim 1, wherein said transverse pivot axis of said lifting boom is located substantially above said front axle.

7. Lifting vehicle according to claim 1, wherein said engine unit is located immediately rearwardly of said front axle in a generally centered position relative to said longitudinal axis.

8. Lifting vehicle according to claim 7, wherein said engine unit is located at least in part between said wheels of said front axle and at an upper level than said front axle, in a slightly inclined condition.

9. Lifting vehicle according to clam 1, wherein said engine unit includes a combustion engine and a transmission, said transmission being selected from the group consisting of hydrostatic, mechanical, and hydrodynamic transmissions.

10. Lifting vehicle according to claim 1, wherein said wheels of said front axle are steerable wheels and have a smaller diameter than the diameter of said wheels of said rear axle which are non-steerable wheels.

11. Lifting vehicle according to claim 1, wherein said lifting boom in said lowered position is located at a substantially lower level than said control and driving cab.

12. A lifting vehicle comprising:

a bearing structure with motor-driven wheels, a control and driving station, a telescopically extendable and retractable lifting boom having a front end and a rear end, said lifting boom being located in proximity of said control and driving station and being movable relative to said bearing structure around a transverse axis, and a power take-off, wherein said transverse axis is located at said front end of said lifting boom, said rear end of said lifting boom including a three-point hitch means for agricultural implements operable by said power take-off, and said lifting boom defining a power-lift for said agricultural implements, whereby said lifting vehicle is also operable as an agricultural tractor.

13. Lifting vehicle according to claim 12, wherein said lifting boom is located on one side of said control and driving station.

14. Lifting vehicle according to claim 13, wherein:

said control and driving station is offset towards one side of said bearing structure relative to said longitudinal axis, said lifting boom is offset towards the other side of said bearing structure relative to said longitudinal axis, said rear end of said lifting boom is provided with a mounting structure to center said three-point hitch means with respect to said longitudinal axis.

15. Lifting vehicle according to claim 14, wherein said mounting structure is pivotally connected to said rear end of said lifting boom.

16. Lifting vehicle according to claim 12, wherein said control and driving station can be selectively positioned either in a forwardly or in a rearwardly-facing position.

17. A lifting vehicle comprising:

a bearing structure having wheels, a longitudinal central axis, a front section, and a rear section, an engine unit, a control and driving cab, a telescopically extendable and retractable lifting boom located on one side of said control and driving cab and having front and rear ends, one of said front and rear ends being pivotally connected to said bearing structure around a transverse axis, actuator means to operate movement of said lifting boom around said transverse axis between a lowered position, in which said lifting boom is arranged substantially parallel to said longitudinal axis of said bearing structure, and a raised position, a power take-off, a three-point hitch means and, a power-lift means for agricultural implements located adjacent said rear section when the lifting boom is in the lowered position, whereby said lifting vehicle is operable also as an agricultural tractor, wherein:

said transverse pivot axis of said lifting boom is located in said front section of said bearing structure, whereby said lifting boom is said pivotally connected at said front end thereof, said three-point hitch means is carried by said rear end of said lifting boom, and said power-lift means for agricultural implements is provided by said lifting boom itself.

18. Lifting vehicle according to claim 17, wherein:

said control and driving cab is offset towards one side of said bearing structure relative to said longitudinal axis, said lifting boom is offset towards the other side of said bearing structure relative to said longitudinal axis, said rear end of said lifting boom is provided with a mounting structure to center said three-point hitch means with respect to said longitudinal axis.

19. Lifting vehicle according to claim 18, wherein said mounting structure is swingably connected to said rear end of said lifting boom.

20. Lifting vehicle according to claim 17, wherein said control and driving cab includes controls and a seat which can be selectively positioned either in a forwardly or in a rearwardly-facing condition.

21. Agricultural tractor comprising:

a bearing structure having a central longitudinal axis, a front section, and a rear section and further provided with two respectively front and rear axles each having a pair of wheels, an engine unit, a control and driving cab, a power take-off, a three-point hitch means and, a power-lift means for agricultural implements located adjacent said rear section when the lifting boom is in the lowered position, a telescopically extendable and retractable lifting boom arranged in proximity of said control and driving cab and having front and rear ends, one of said front and rear ends being pivotally connected to said bearing structure around a transverse axis, actuator means to operate movement of said lifting boom around said transverse axis between a lowered position, in which said lifting boom is arranged substantially parallel to said longitudinal axis of said bearing structure, and a raised position, whereby said agricultural tractor is also operable as a lifting machine, wherein:

said transverse pivot axis of said lifting boom is located in said front section of said bearing structure, whereby said lifting boom is said pivotally connected at said front end thereof, said three-point hitch means is carried by said rear end of said lifting boom, and said power-lift means for agricultural implements is provided by said lifting boom itself, and said control and driving cab is arranged at a substantially upper lever relative to said engine unit and is located rearwardly of the latter.

22. Agricultural tractor according to claim 21, wherein said lifting boom is located on one side of said control and driving cab.

23. Agricultural tractor according to claim 21, wherein:

said control and driving cab is offset towards one side of said bearing structure relative to said longitudinal axis, said lifting boom is offset towards the other side of said bearing structure relative to said longitudinal axis, said rear end of said lifting boom is provided with a mounting structure to center said three-point hitch means with respect to said longitudinal axis.

24. Agricultural tractor according to claim 23, wherein said mounting structure is pivotally connected to said rear end of said lifting boom.

25. Agricultural tractor according to claim 21, wherein said control and driving cab includes controls and a seat which can be selectively positioned either in a forwardly or in a rearwardly-facing position.

26. Agricultural tractor according to claim 21, wherein said control and driving cab includes controls and a seat which are oriented at an angle towards said longitudinal axis of said bearing structure.

27. Agricultural tractor according to claim 21, wherein said transverse pivot axis of said lifting boom is located substantially above said front axle.

28. Agricultural tractor comprising:

a bearing structure having a central longitudinal axis, a front section, and a rear section and further provided with two respectively front and rear axles each having a pair of wheels, an engine unit, a control and driving cab, a power take-off, a three-point hitch means and, a power-lift means for agricultural implements located adjacent said rear section when the lifting boom is in the lowered position, a telescopically extendable and retractable lifting boom arranged in proximity of said control and driving cab and having front and rear ends, one of said front and rear ends being pivotally connected to said bearing structure around a transverse axis, actuator means to operate movement of said lifting boom around said transverse axis between a lowered position, in which said lifting boom is arranged substantially parallel to said longitudinal axis of said bearing structure, and a raised position, whereby said agricultural tractor is also operable as a lifting machine, wherein:

said transverse pivot axis of said lifting boom is located in said front section of said bearing structure, whereby said lifting boom is said pivotally connected at said front end thereof, said three-point hitch means is carried by said rear end of said lifting boom, and said power-lift means for agricultural implements is provided by said lifting boom itself, and said engine unit is located immediately rearwardly of said front axle in a generally centered position relative to said longitudinal axis.

29. Agricultural tractor according to claim 28, wherein said engine unit is located at least in part between said wheels of said front axle and at an upper level with respect to the latter, in a slightly inclined condition.

30. Lifting vehicle according to clam 21, wherein said engine unit includes a combustion engine and a transmission, said transmission being selected from the group consisting of hydrostatic, mechanical, and hydrodynamic transmissions.

31. Agricultural tractor according to claim 21, wherein said wheels of said front axle are steerable wheels and have a smaller diameter than the diameter of said wheels of said rear axle which are non steerable wheels.

32. Agricultural tractor according to claim 21, wherein said lifting boom in said lowered position is located at a substantially lower level than said control and driving cab.

* * * * *

UNITED STATES PATENT AND TRADEMARK OFFICE
CERTIFICATE OF CORRECTION

PATENT NO. : 6,390,764 B1
DATED : May 21, 2002
INVENTOR(S) : Merlo et al.

It is certified that error appears in the above-identified patent and that said Letters Patent is hereby corrected as shown below:

Column 2,
Line 2, after "of" delete "a".
Line 40, after "while" delete "been" and insert therefore -- being --.

Column 3,
Line 27, after "that" insert therefor -- of --.
Line 28, after "provide" insert therefor -- a --.
Line 42, after "need" delete "of resorting" and insert therefor -- to resort --.

Column 4,
Line 28, after "a" (first occurrence) delete "convention" and insert therefore -- conventional --.
Line 64, after "includes" delete "a".

Column 5,
Line 2, after "conditions" insert -- the --.
Line 14, after "is" delete "swingable" and insert therefor -- pivotable --.
Line 32, after "is" delete "swing".
Line 33, before "supported" delete "ably" and insert therefor -- pivotably --.
Line 39, after "plate" delete "4" and insert therefor -- 14 --.

Column 6,
Line 4, after "and" delete "swingable" and insert therefor -- pivotable --.

UNITED STATES PATENT AND TRADEMARK OFFICE
CERTIFICATE OF CORRECTION

PATENT NO. : 6,390,764 B1
DATED : May 21, 2002
INVENTOR(S) : Merlo et al.

It is certified that error appears in the above-identified patent and that said Letters Patent is hereby corrected as shown below:

Column 8,
Line 62, after "is" delete "swingably" and insert therefor -- pivotally --.

Column 10,
Line 54, after "are" delete "non steerable" and insert therefor -- non-steerable --.

Signed and Sealed this

Sixth Day of September, 2005

JON W. DUDAS
*Director of the United States Patent and Trademark Office*